(12) United States Patent
Jiang et al.

(10) Patent No.: US 9,258,476 B2
(45) Date of Patent: Feb. 9, 2016

(54) AUTOMATIC IMAGE-CAPTURING SYSTEM

(71) Applicant: National Taiwan University, Taipei (TW)

(72) Inventors: Joe-Air Jiang, Taipei (TW); Hsiao-Wei Yuan, Taipei (TW); Chyi-Rong Chiou, Taipei (TW); Cheng-Long Chuang, Taipei (TW); Chia-Pang Chen, Taipei (TW); Chun-Yi Liu, Taipei (TW); Yu-Sheng Tseng, Taipei (TW); Chung-Hang Hong, Taipei (TW); Min-Sheng Liao, Taipei (TW); Tzu-Shiang Lin, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 14/448,453

(22) Filed: Jul. 31, 2014

(65) Prior Publication Data
US 2015/0036012 A1    Feb. 5, 2015

(30) Foreign Application Priority Data

Jul. 31, 2013    (TW) .............................. 102127386 A

(51) Int. Cl.
*H04N 5/232* (2006.01)

(52) U.S. Cl.
CPC ....... *H04N 5/23206* (2013.01); *H04N 5/23241* (2013.01)

(58) Field of Classification Search
CPC ................... H04N 5/233206; H04N 5/23241
USPC ....................................................... 348/211.3
See application file for complete search history.

(56) References Cited

U.S. PATENT DOCUMENTS

| 8,629,912 | B2* | 1/2014 | Muramatsu | H04N 5/232 348/222.1 |
|---|---|---|---|---|
| 2001/0019360 | A1* | 9/2001 | Tanaka | H04N 5/23203 348/211.99 |
| 2012/0042358 | A1* | 2/2012 | Kondur | G06F 21/316 726/3 |

* cited by examiner

*Primary Examiner* — Gevell Selby
(74) *Attorney, Agent, or Firm* — Mintz Levin Cohn Ferris Glovsky and Popeo, P.C.; Peter F. Corless; Steven M. Jensen

(57) ABSTRACT

An automatic image-capturing system is used for capturing an image and transmitting the image to a remote device. The automatic image-capturing system includes a photography module for capturing the image; a storage module for storing the image captured by the photography module; a transmission module for receiving a control instruction sent by the remote device; a master core module for making the photography module to capture the image based on the control instruction, and segmenting the image into a plurality of files and segmenting the files into a plurality of packets to be transmitted to the remote device by the transmission module, and a slave core module for monitoring the operations of the master core module to turn off and restart the master core module when there is an abnormal operation in the master core module.

7 Claims, 6 Drawing Sheets

| Flag | Priority | Accumulative Thread | Photography Module Related Index | Transmission module Related Index |
|---|---|---|---|---|
| Data Retransmit Flag | 1st | No | Turned On | Turned On |
| Image Upload Flag | 2nd | No | Turned Off | Turned On |
| Video Record Flag | 3rd | Yes | Turned On | Turned Off |
| Image Capture Flag | 4th | Yes | Turned On | Turned On |
| Instruction Read Flag | 5th | Yes | Turned Off | Turned On |

FIG. 2

| Starting Word | Packet Number$_1$ | Packet Number$_2$ | File Number$_1$ | File Number$_2$ | ...... | File Number$_n$ | Checking Code$_1$ | Checking Code$_2$ | Ending Word |

FIG. 6

AUTOMATIC IMAGE-CAPTURING SYSTEM

CROSS-REFERENCES TO RELATED APPLICATIONS

This application claims under 35 U.S.C. §119(a) the benefit of Taiwanese Application No. 102127386, filed Jul. 31, 2013, the entire contents of which is incorporated herein by reference.

FIELD OF THE INVENTION

The present invention relates to an image-capturing system, and more particularly, to an automatic image-capturing system with a master-slave architecture, a remote control, data retransmission and power management.

BACKGROUND OF THE INVENTION

In the field of outdoor image capturing, monitoring systems are often placed in a relatively desolated and harsh environment, so when a failure occurs in the machines due to the harsh environment (such as rain, moisture, and etc.) or power exhaustion, a considerable amount of labor is required to restart the systems. This may delay the progress of monitoring.

In addition, if wireless monitoring and control is employed for machines that are located in areas where the qualities of the wireless signals are often poor, the machines may consume a large amount of power attempting to connect to the networks when wireless signal quality is low, furthermore, monitoring data may not be complete due to loss of packets. Moreover, the optical setup and the time required for image capturing of the monitoring machines cannot be remotely adjusted in some cases, resulting in degradation in the qualities of the captured images as well as a large quantity of redundant data and unnecessary power consumption.

Thus, in view of the above drawbacks, an automatic image-capturing system is proposed in the disclosure to address the various shortcomings described above.

SUMMARY OF THE INVENTION

In light of the foregoing drawbacks, the present invention provides an automatic image-capturing system, which includes a photography module for capturing an image; a storage module for storing the image captured by the photography module; a transmission module for receiving a control instruction sent by the remote device; a master core module for making the photography module capture the image based on the control instruction, segmenting the image into a plurality of files and segmenting the files into a plurality of packets to be transmitted to the remote device by the transmission module, wherein when the remote device detects that the loss rate of the packets exceeds a predetermined threshold value, the master core module, based on the control instruction sent by the remote device, changes the size of the files and/or the packets, or when the remote device loses a packet, the master core module, based on the control instruction sent by the remote device, retransmits the lost packet; and a slave core module for monitoring operations of the master core module to turn off and restart the master core module when there is an abnormal operation in the master core module. In addition, when the signal quality of a channel used by the transmission module is poor, the automatic image-capturing system of the present invention allows the transmission module to switch automatically to another channel or allows the master core module to turn off the transmission module automatically. Furthermore, the automatic image-capturing system of the present invention further includes a plurality of operation modes to turn on or off the photography module or the transmission module.

Therefore, with the functions of the various modules described above, the present invention provides an automatic image-capturing system with better image capturing quality, image transmission quality, and power usage efficiency, as well as longer independent operating period compared to the conventional image-capturing systems.

BRIEF DESCRIPTION OF THE DRAWINGS

The present invention can be more fully understood by reading the following detailed description of the preferred embodiments, with reference made to the accompanying drawings, wherein:

FIG. 2 is a schematic diagram depicting operation modes of a master core module in accordance with the present invention;

FIG. 6 is a schematic diagram depicting an encoding format of an image after segmentation in accordance with an embodiment of the present invention.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can be practiced or applied with other different embodiments, and the various details described in this specification can be modified or changed in view of different perspectives and applications without departing from the spirit of the present invention.

Figure 1:
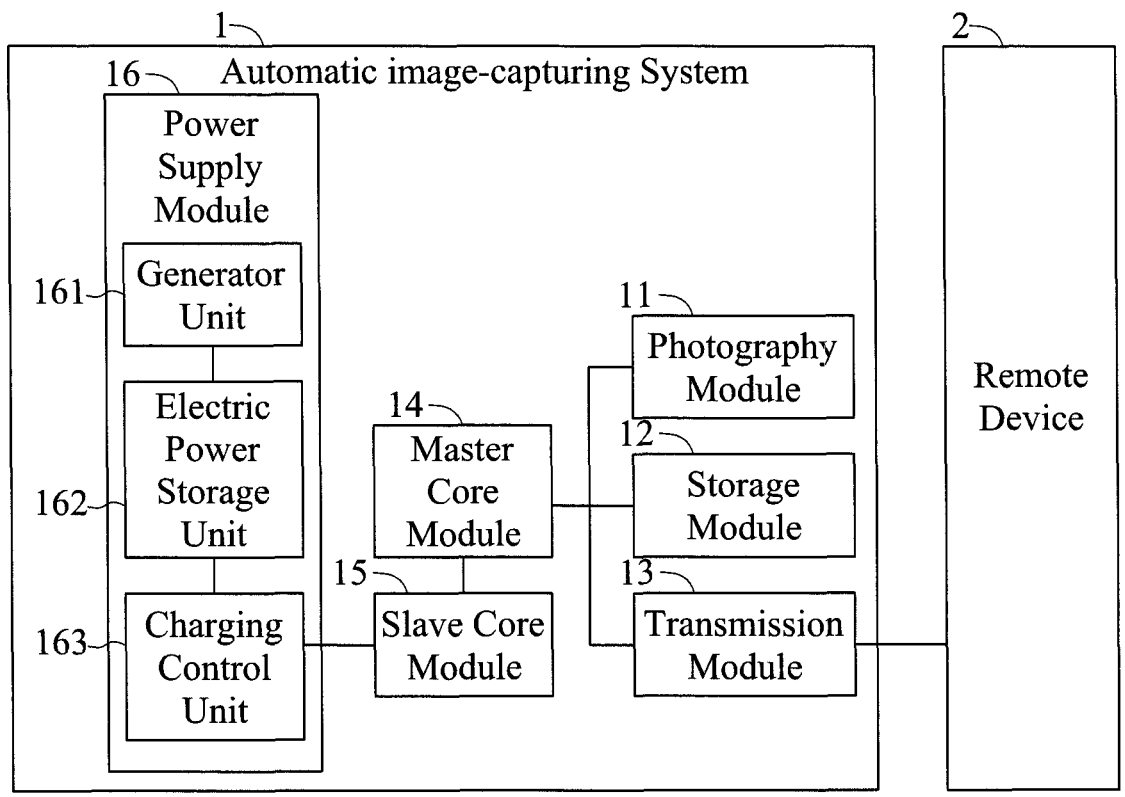
FIG. 1 is a schematic diagram depicting the structure of an automatic image-capturing system in accordance with an embodiment of the present invention.

Referring to FIG. 1, a schematic diagram depicting the structure of an automatic image-capturing system 1 in accordance with an embodiment of the present invention is shown. The automatic image-capturing system 1 is used for capturing an image and transmitting it to a remote device 2 so that the remote device 2 can carry out reorganizing, recording and analysis of the captured image. The remote device 2 is generally an electronic apparatus capable of storing data and performing data processing, such as a desktop computer, a laptop computer and the like. In an embodiment of the present invention, the automatic image-capturing system 1 includes a photography module 11, a storage module 12, a transmission module 13, a master core module 14, and a slave core module 15.

The photography module 11 is used for capturing an image based on control instructions of the remote device 2 received by the master core module 14. The image may include a photo or a video. During capturing of an image, the control instructions are used for setting up the shooting configurations of the photography module 11 (e.g. aperture, contrast, white balance, shooting time and etc.) in order to obtain an ideal image.

The storage module 12 is generally, but not limited to, an electronic apparatus for providing accessible data, such as a hard disk or a non-volatile memory (e.g. Flash). The storage module 12 is used for storing an image, which is transmitted via the master core module 14 by the photography module 11 after being captured. Moreover, when the master core module 14 needs to transmit an image to the remote device 2, the master core module 14 can read the image from the storage module 12.

The transmission module 13 is used for receiving the control instructions sent by the remote device 2, transmitting the control instructions to the master core module 14 and transmitting an image read by the master core module 14 from the storage module 12 to the remote device 2.

The master core module 14 instructs the photography module 11 to capture an image based on the control instructions of the remote device 2, and then transmits the image to the storage module 12 for storage. When an image is transmitted to the remote device 2, the master core module 14 reads the image from the storage module 12, and segments the image into more than one file. The files can be further segmented into a plurality of packets to be passed onto the transmission module 13, which then transmits the packets to the remote device 2, wherein if the remote device 2 detects that the loss rate of the packets exceeds a predetermined threshold value, the master core module 14 then, based on the control instructions sent by the remote device 2, changes the transmission interval of the packets or reorganizes the number of files and/or packets of the image to be transmitted so as to further segment the files and/or packets of the image to be transmitted to make the files and/or packets even smaller. Thus, the effective transmission rate of the image file is increased. In the event that the remote device 2 loses a packet, based on the control instructions sent by the remote device 2, the master core module 14 can retransmit the lost packet to ensure the integrity of the image received by the remote device 2.

The slave core module 15 is used for monitoring the operations of the master core module 14 and supplying the power required by the master core module 14. When there are abnormal activities in the master core module 14, the master core module 14 can be shut down and restarted. As a result, when the system is not manned and there is slight abnormality of the master core module 14, the automatic image-capturing system 1 is ensured to have long-term independent operations.

Moreover, in another embodiment of the present invention, the automatic image-capturing system 1 further includes a power supply module 16, which includes a generator unit 161, an electric power storage unit 162, and a charging control unit 163.

The generator unit 161 is used for generating electric power and can operate independently under unmanned environment. Thus, the generator unit 161 is preferably, but not limited to, a solar power system.

However, a solar power system can only generate electricity when there is sun light, so that the electricity needs to be stored for times when there is no sun light. In view of this, the power supply module 16 includes the electric power storage unit 162 electrically connected with the generator unit 161 for obtaining and storing electric power from the generator unit 161. The electric power storage unit 162 is preferably, but not limited to, a rechargeable battery with low memory effect, such as a lead-acid battery or a lithium battery.

In addition, the automatic image-capturing system of the present invention may include the charging control unit 163 connected to the electric power storage unit 162 to obtain power from the electric power storage unit 162 and supply it to the slave core module 15, and when the electric power stored in the electric power storage unit 162 is too low, the charging control unit 163 stops supplying power to the slave core module 15 so as to avoid causing damage to the electric power storage unit 162.

Another embodiment of the master core module 14 in accordance with the present invention is illustrated in FIG. 2. In this embodiment, the master core module 14 has a plurality of modes for the remote device 2 to have more control over it. In FIG. 2, the master core module 14 has a control flow already written therein. The control flow includes flags that constitute operation modes. The timings for triggering these flags can be determined by the control instructions of the remote device 2, so that the master core module 14 will actuate based on the control instructions of the remote device 2 at the times desired by users. During actuation, the photography module 11 and the transmission module 13 are turned on or off in response to the operation modes.

In FIG. 2, the control flow written into the master core module 14 are executed in the form of flags, and the triggering times of these flags will be set up depending on the control instructions of the remote device 2. When the automatic image-capturing system 1 is activated, the automatic image-capturing system 1 communicates with the master core module 14, and then the master core module 14 sequentially enables the various flags based on their priorities. These flags may be, but not limited to, data retransmission flags, image upload flags, video record flags, image capture flags, and instruction (control instruction) read flags. The photography module 11 and the transmission module 13 are turned on or off according to the related indices in the flags, thereby saving power consumption of the automatic image-capturing system 1, and thus prolonging the operating time of the automatic image-capturing system 1.

Figure 3:
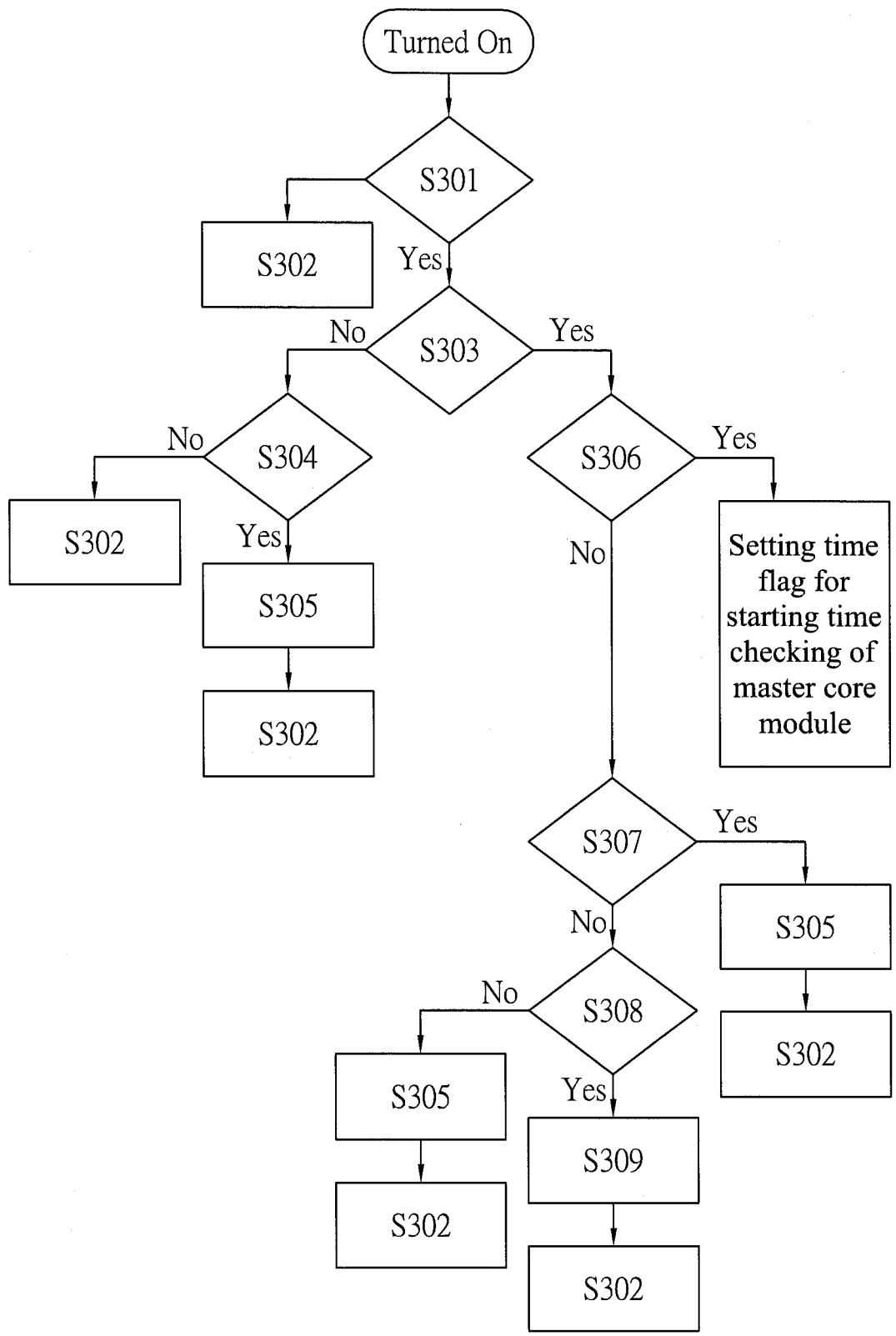
FIG. 3 is a flowchart illustrating a working flow of a slave core module in accordance with an embodiment of the present invention.

FIG. 3 is a flowchart illustrating a working flow of the slave core module 15 in accordance with an embodiment of the present invention. First, after system is started, step S301 is performed to read time and determine if this is the time for the master core module 14 to be turned on. If it is not the time to turn on the master core module 14, then step S302 is performed, in which a sleep mode is entered (the photography module 11 and the transmission module 13 are turned off). If it is the time to turn on the master core module 14, step S303 is performed to turn on the master core module 14 and determine if a microcontroller of the master core module 14 is transmitting activity information of the master core module 14. If the microcontroller of the master core module 14 is not transmitting activity information of the master core module 14, step S304 is performed to check if the time interval exceeds 30 minutes. If the time interval does not exceed 30 minutes in step S304, step S302 is performed to enter into the sleep mode. If the time interval exceeds 30 minutes in step S304, then step S305 is performed to restart the master core module 14 and set a time flag for the starting of this time checking so that it can be used as a basis for determining whether the interval of time checking exceeds 30 minutes in the next round, thereafter step S302 is performed to enter into the sleep mode. If the microcontroller of the master core module 14 is transmitting activity information of the master core module 14 in step S303, then step S306 is performed to determine if the activity information of the master core module 14 is normal. If the activity information of the master core module 14 is normal in step S306, then step S307 is performed to set a time flag for the starting time of checking of the master core module 14 so that it can be used as a basis for determining whether the interval of time checking exceeds 30 minutes in the next round, thereafter proceed to step S302 to enter into the sleep mode. If the activity information of the master core module 14 is not normal in step S306, then step S307 is performed to determine if the activity information of the master core module 14 is abnormal. If the activity information of the master core module 14 is abnormal in step S307, then step S305 is performed to restart the master core module 14 and set a time flag for the starting of this time checking so that it can be used as a basis for determining whether the interval of time checking exceeds 30 minutes in the next round, thereafter proceed to step S302 to enter into the sleep mode. If the activity information of the master core module 14 is not abnormal in step S307, step S308 is performed to determine if the activity information of the master core module 14 is turned off. If the activity information of the master core module 14 is turned off in step S308, then step S309 is performed to turn off the master core module 14, thereafter proceed to step S302 to enter into the sleep mode. If the activity information of the master core module 14 is not turned off in step S308, then step S305 is performed to restart the master core module 14 and set a time flag for the starting of this time checking so that it can be used as a basis for determining whether the interval of time checking exceeds 30 minutes in the next round, thereafter proceed to step S302 to enter into the sleep mode. As a result, the slave core module 15 can use the flow of FIG. 3 to monitor and determine if the activities of the master core module 14 are normal, and when there is an abnormal activity in the master core module 14, the master core module 14 is restarted, thereby ensuring the automatic image-capturing system 1 to have long-term independent operations.

Figure 4:
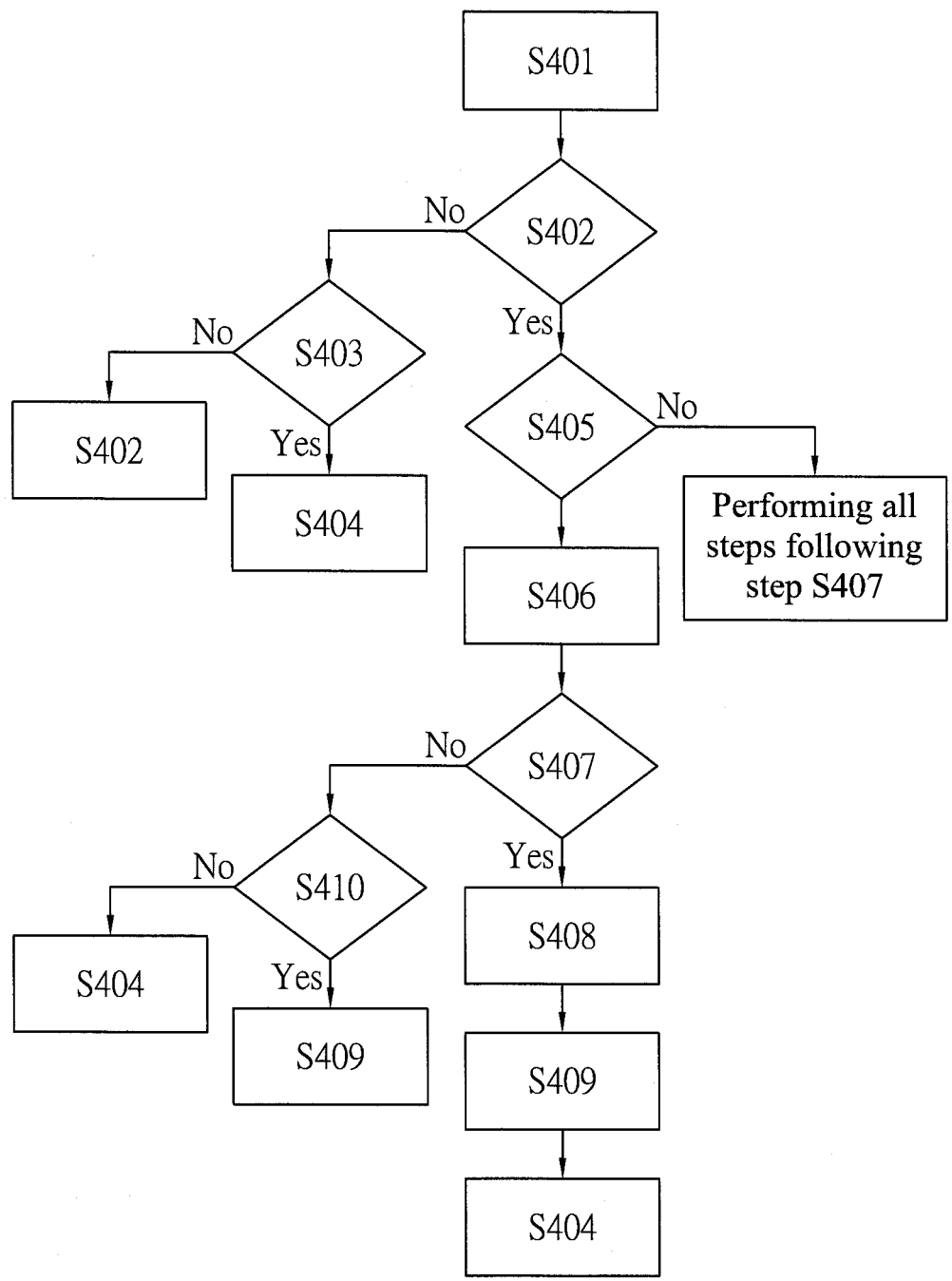
FIG. 4 is a flowchart illustrating working flows of image capturing, image storing, image transmitting and image retransmitting in accordance with an embodiment of the present invention.

FIG. 4 is a flowchart illustrating working flows of image capturing, image storing, image transmitting and image retransmitting in accordance with an embodiment of the present invention. The process in FIG. 4 begins once the image capture flag of FIG. 2 is enabled.

First, step S401 is performed to enable the photography module 11, then step S402 is performed to reset the photography module 11 in order to synchronize the times of the photography module 11 and the automatic image-capturing system 1, and to determine if the time synchronization is successful. If the time synchronization is not successful, step S403 is performed to increase retry operations so as to repeat the time synchronization, and to determine if the number of retry operations exceeds a predetermined threshold value (which is set, but not limited, to 5 in this embodiment). If the number of retry operations does not exceed a predetermined threshold value, then step S402 is performed to reset the photography module 11. If the number of retry operations exceeds a predetermined threshold value, then step S404 is performed to end the enabling of the photography module 11. If the time synchronization is successful in step S402, then step S405 is performed to setup the resolution and compression rate specified by the control instructions of the remote device 2, and determine if the present time is the image (photo) capturing time specified by the control instructions of the remote device 2. If the present time is the image (photo) capturing time specified by the control instructions of the remote device 2, step S406 is performed to obtain the shooting configurations (aperture or contras, for example) specified by the control instructions of the remote device 2, capture an image (photo) based on the parameters set by the shooting configurations, encode the image (photo) and store it in the storage module 12 via the master core module 14. Then, step S407 is performed to determine if the present time is the image (photo) capturing time specified by the control instructions of the remote device 2. If the present time is the image (photo) capturing time specified by the control instructions of the remote device 2, step S408 is performed to obtain the shooting configurations (aperture or contras, for example) specified by the control instructions of the remote device 2, capture an image (photo) based on the parameters set by the shooting configurations, encode the image (photo) and store it in the storage module 12 via the master core module 14. After taking photos, step S409 is performed to select an image to be transmitted back to the remote device 2, and allow the master core module 14 to read the image from the storage module 12 and transmit it back to the remote device 2 via the transmission module 13. Finally, step S404 is performed to end the working flow of the photography module 11. If the present time is not the image (photo) capturing time specified by the control instructions of the remote device 2 in step S407, step S410 is performed to determine if the present time is the image retransmission time. If the present time is the image retransmission time, steps S410 and S404 are performed. If the present time is not the image retransmission time, step S404 is performed. Furthermore, if the present time is not the image (photo) capturing time specified by the control instructions of the remote device 2 in step S405, then all the steps following step S407 are performed.

Thus, with the process in FIG. 4, abnormal operations of the photography module 11 resulting from failure in timing synchronization of the photography module 11 and the automatic image-capturing system 1 can be avoided. In addition, shooting configurations can also be set by the control instructions of the remote device 2, such that an ideal image is obtained.

Figure 5:
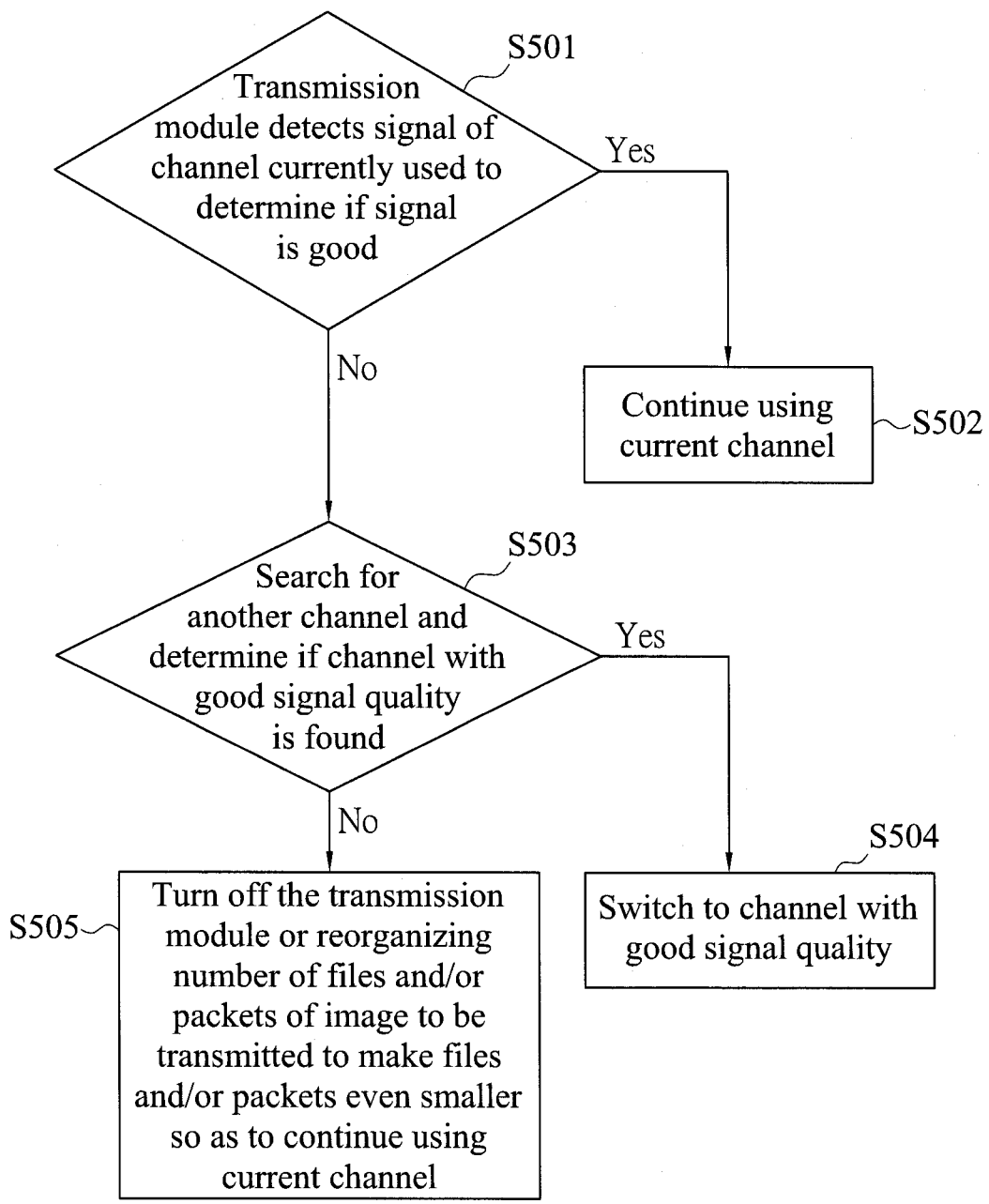
FIG. 5 is a flowchart illustrating a work flow of a transmission module when the signal quality of a channel used by the transmission module is poor in accordance with an embodiment of the present invention.

FIG. 5 is a flowchart illustrating a work flow of the transmission module 13 in accordance with an embodiment of the present invention when the signal quality of a channel used by the transmission module 13 is poor. The process begins with step S501, in which the transmission module 13 detects the signal of a channel currently used and determines if the signal is good. If the signal is good, step S502 is performed to continue using the current channel. If the signal is poor, step S503 is performed to search for another channel and to determine if a channel with good signal quality is found. If a channel with good signal quality is found, then step S504 is performed to switch the transmission module 13 to this channel with good signal quality. If a channel with good signal quality is not found, then step S505 is performed to turn off the transmission module 13.

Furthermore, the master core module 14 in another embodiment of the present invention may, in step S505, further include reorganizing the number of files and/or packets of the image to be transmitted so as to further segment the files and/or packets of the image to be transmitted, and to make the files and/or packets even smaller so as to continue using the current channel for transmitting the image to the remote device 2, thereby reducing invalid transmission of the files. Therefore, the process in FIG. 5 can effectively reduce invalid file transmission while the signal is poor, thus reducing power waste and increasing the efficiency of power usage of the automatic image-capturing system 1.

FIG. 6 is a schematic diagram depicting an encoding format of an image after segmentation in accordance with an embodiment of the present invention. In this embodiment, an image is segmented into more than one file, and each file is further segmented into a plurality of packets. Then, the files and packets are accumulatively encoded by the master core module 14 to facilitate reorganization of the image by the remote device 2 and to be used as the basis for retransmission of any image packet. In this embodiment, the encoding format of the packets is as shown in FIG. 6, that is, the format includes a starting word, packet numbers 1~2, file numbers 1~n, checking codes 1~2, and an ending word, wherein the starting word and the ending word indicate the starting and ending positions of a section, respectively, and packet numbers 1~2 and file numbers 1~n are the accumulative encodings of the packets and the files after image segmentation, respectively, and wherein file numbers 1~n are the accumulative encodings for the image, and the packet numbers 1~2 are the accumulative encodings for a single file. In addition, checking codes 1~2 are checking codes used for the remote device 2 to determine if this section of information is correct. However, the present invention is not limited to this embodiment. With the encoding format after image segmentation shown in FIG. 6, the remote device 2 can instruct the automatic image-capturing system 1 to accurately retransmit any lost packet and reorganize the lost packet into the appropriate image, thereby ensuring the integrity of the image received by the remote device 2.

In summary of the above, compared to the prior art, the present invention employs the master core module to use different shooting parameters based on the control instructions of the remote device in order to obtain images with good quality. In addition, in the case of the remote device losing a packet, the master core module of the present invention can retransmit the lost packet to the remote device based on the encoding of the packet to ensure the integrity of the image received by the remote device. The master core module further includes a plurality of operation modes to turn on or off the photography module or the transmission module in the system under different conditions, thereby effectively increasing the efficiency of power usage of the system. Furthermore, when the transmission signal is poor or the packet loss rate at the remote device exceeds a predetermined threshold value, the automatic image-capturing system of the present invention can segment the files and/or the packets of an image, turn off the transmission module and automatically switch channels to ensure the integrity of the image received by the remote device, so as to increase the effective transmission rate of the image files, and save power consumption. Moreover, the present invention employs the slave core module to monitor the operations of the master core module and to restart the master core module, ensuring that the automatic image-capturing system has long-term independent operations.

The above embodiments are only used to illustrate the principles of the present invention, and should not be construed as to limit the present invention in any way. The above embodiments can be modified by those with ordinary skill in the art without departing from the scope of the present invention as defined in the following appended claims.

What is claimed is:

1. An automatic image-capturing system for capturing an image and transmitting the image to a remote device, the automatic image-capturing system comprising:

a photography module for capturing the image;

a storage module for storing the image captured by the photography module;

a transmission module for receiving a control instruction sent by the remote device;

a master core module for making the photography module capture the image based on the control instruction, and segmenting the image into a plurality of files and segmenting the files into a plurality of packets to be transmitted to the remote device by the transmission module, wherein when the remote device detects that a loss rate of the packets exceeds a predetermined threshold value, the master core module, based on the control instruction sent by the remote device, changes sizes of the files and/or the packets, or when the remote device loses at least one of the packets, the master core module, based on the control instruction sent by the remote device, retransmits the at least one of the packets; and a slave core module for monitoring operations of the master core module so as to turn off and restart the master core module when there is an abnormal operation in the master core module.

2. The automatic image-capturing system of claim 1, wherein when a channel used by the transmission module has a poor signal, the transmission module is automatically switched to another channel.

3. The automatic image-capturing system of claim 2, wherein when all channels used by the transmission module have poor signals, the master core module automatically turns off the transmission module, or changes the sizes of the files and/or the packets to be transmitted in the channel used by the transmission module.

4. The automatic image-capturing system of claim 1, wherein the master core module includes a plurality of operation modes for turning on or off the photography module or the transmission module.

5. The automatic image-capturing system of claim 1, wherein the packets have encodings based on the files and the packets segmented from the image for the master core module to retransmit the at lease one of the packets based on the encodings of the packets.

6. The automatic image-capturing system of claim 1, wherein the photography module includes a determination unit for determining a number of repetition of a synchronization flow, determining whether the number of repetition exceeds a predetermined threshold value, and capturing the image when the number of repetition exceeds the predetermined threshold value.

7. The automatic image-capturing system of claim 1, wherein when the master core module is enabled and there is no communication between the master core module and the slave core module for a predetermined period of time, the slave core module turns off and restarts the master core module.

* * * * *